(12) United States Patent
Long et al.

(10) Patent No.: US 10,354,294 B2
(45) Date of Patent: Jul. 16, 2019

(54) METHODS AND SYSTEMS FOR PROVIDING THIRD-PARTY CONTENT ON A WEB PAGE

(71) Applicant: Google Inc., Mountain View, CA (US)

(72) Inventors: Thomas James Worthington Long, London (GB); Pieter Albertus Mathijs Senster, London (GB)

(73) Assignee: Google LLC, Mountain View, CA (US)

( * ) Notice: Subject to any disclaimer, the term of this patent is extended or adjusted under 35 U.S.C. 154(b) by 1148 days.

(21) Appl. No.: 14/012,571

(22) Filed: Aug. 28, 2013

(65) Prior Publication Data

US 2015/0066665 A1    Mar. 5, 2015

(51) Int. Cl.
| | | |
|---|---|---|
| G06Q 30/00 | (2012.01) | |
| G06F 17/30 | (2006.01) | |
| G06Q 30/02 | (2012.01) | |
| G06F 16/957 | (2019.01) | |

(52) U.S. Cl.
CPC ..... G06Q 30/0277 (2013.01); G06F 16/9577 (2019.01)

(58) Field of Classification Search
CPC ................................ G06Q 30/02; G06F 17/30
See application file for complete search history.

(56) References Cited

U.S. PATENT DOCUMENTS

| | | | |
|---|---|---|---|
| 6,496,803 B1 | 12/2002 | Seet et al. | |
| 6,907,566 B1 | 6/2005 | McElfresh et al. | |
| 6,983,331 B1 * | 1/2006 | Mitchell | G06F 17/30905 707/E17.121 |
| 7,213,200 B2 * | 5/2007 | Abe | G06F 17/2241 715/230 |
| 8,176,414 B1 * | 5/2012 | Baluja | G06F 17/30905 715/234 |
| 8,375,305 B1 | 2/2013 | Strand | |

(Continued)

FOREIGN PATENT DOCUMENTS

| | | |
|---|---|---|
| EP | 2 843 607 | 3/2015 |
| KR | 10-2008-0042051 | 5/2008 |
| WO | WO-2013/181671 | 5/2013 |

OTHER PUBLICATIONS

International Search Report and Written Opinion on Application No. PCT/US2013/059469 dated Jun. 2, 2014.

(Continued)

*Primary Examiner* — Sun M Li
*Assistant Examiner* — Thuy N Nguyen
(74) *Attorney, Agent, or Firm* — Foley & Lardner LLP

(57) ABSTRACT

Systems and methods for automatically identifying visually sensible locations in which third-party content can be placed on a web page and configuring the web page to display third-party content at the identified locations. A processor identifies a root element of a web page within which to insert third-party content slots for providing third-party content items. The processor identifies visible content items within the root element and identifies anchorable elements within the root element around which a third-party content slot is insertable. Each of the anchorable elements corresponds to a respective identified visible content item that has bounds that extend from a first predefined region to a second predefined region of the web page. The processor determines that one or more positions relative to the identified anchorable elements are usable for inserting a third-party content slot. The processor generates a list including positions relative to the identified anchorable elements determined to be usable.

13 Claims, 6 Drawing Sheets

(56) References Cited

U.S. PATENT DOCUMENTS

| | | | |
|---|---|---|---|
| 2004/0118907 A1* | 6/2004 | Rosenbaum | B07C 3/00 235/375 |
| 2006/0206380 A1* | 9/2006 | Joo | G06Q 30/02 705/14.49 |
| 2009/0007171 A1 | 1/2009 | Casey et al. | |
| 2010/0211467 A1* | 8/2010 | Ramanathan | G06F 17/30899 705/14.72 |
| 2010/0241497 A1 | 9/2010 | Rittman et al. | |
| 2010/0332328 A1 | 12/2010 | Dharmaji et al. | |
| 2011/0137737 A1 | 6/2011 | Baird et al. | |
| 2012/0260157 A1* | 10/2012 | Zhu | G06F 17/30902 715/234 |
| 2013/0204867 A1* | 8/2013 | Lim | G06F 17/3053 707/723 |
| 2013/0212498 A1* | 8/2013 | Lim | G06F 3/0481 715/760 |
| 2013/0339139 A1* | 12/2013 | Meyers | G06Q 30/0275 705/14.49 |

OTHER PUBLICATIONS

Ad Code—Adzerk Knowledge Base—Aug. 19, 2013 http://help.adzerk.com/Ad_Code.
"Can I protect my website from client side ad injection?," http://stackoverflow.com/questions/30680599/can-i-protect-my-website-from-client-side-ad-injection (Sep. 2015).
"MTNL to Hijack Your Browser and Insert Pop-Up Ads. Is It Legal?," http://trak.in/tags/business/2015/06/24/mtnl-hijack-pop-up-ads-browser-legal/ (Sep. 2015).
International Search Report and Written Opinion, International Application No. PCT/US2016/049240, dated Oct. 26, 2016.
Kapravelos, A., et al., "Hulk: Eliciting Malicious Behavior in Behavior in Browser Extensions," http://cs.ucsb.edu/~kapravel/publications/usenix2014_hulk.pdf (2014).
Communication pursuant to Article 94(3) EPC for EP13190732.1 dated Oct. 6, 2015. (4 pages).
International Preliminary Report on Patentability for PCTUS2016049240 dated Dec. 20, 2017 (25 pages).
U.S. Office Action on U.S. Appl. No. 14/856,181 dated Mar. 27, 2018.
Written Opinion of the International Preliminary Examining Authority for PCT/US2016/049240 dated Sep. 21, 2017. (7 pages).
Office Action for KR Appl. No. 10-2017-7031465, dated Sep. 10, 2018.
Decision of Rejection for Korean Application No. 10-2017-7031465 dated Apr. 29, 2019.

* cited by examiner

METHODS AND SYSTEMS FOR PROVIDING THIRD-PARTY CONTENT ON A WEB PAGE

BACKGROUND

Inserting third-party content items, such as advertisements, into a web page often requires knowledge of a number of web-page related technologies, such as HTML, CSS, Javascript, FTP file transfer, amongst others. At present, a web page designer can modify web page code of a web page to insert HTML and/or Javascript snippets into the existing web page code of a web page to create third party content slots through which ads can be displayed. Less tech-savvy web site owners lack the technical skills required to modify web page code and as such, are unable to insert third-party content slots within which third-party content items can appear along with primary content on a web page.

SUMMARY

The present disclosure provides methods and systems for automatically identifying visually sensible locations in which third-party content can be placed on a web page and configuring the web page to display third-party content at the identified locations. In particular, the present disclosure aims to simplify the ability to display ads at visually sensible locations on a web page such that less tech-savvy web site owners will be able to display ads on their webpage in a visually pleasing manner.

At least one aspect is directed to a computer implemented method for identifying visually sensible locations in which third-party content can be placed on a web page. A data processing system identifies a root element of a web page within which to insert one or more third-party content slots for providing third-party content items. The data processing system identifies one or more visible content items within the root element and identifies anchorable elements within the root element around which a third-party content slot can be inserted. Each of the anchorable elements corresponds to a respective identified visible content item that has bounds that extend from a first predefined region of the web page to a second predefined region of the web page. The data processing system then determines that one or more positions relative to the identified anchorable elements are usable for inserting a third-party content slot. The data processing system generates a list including positions relative to the identified anchorable elements that are determined to be usable.

In some implementations, the data processing system identifies a root element of the web page comprises inspecting source code of the web page. In some implementations, the data processing system identifies a text node or one or more predetermined tags within source code of the web page. In some implementations, the data processing system identifies anchorable elements within the root element around which a third-party content slot can be inserted by identifying all visible content items within the root element, recording the bounds of each of the identified visible content items, and identifying an element corresponding to a visible content item that has bounds that extend from a first predefined region of the web page to a second predefined region of the web page as an anchorable element.

In some implementations, the data processing system determines bounds of the visible content items of the root element. Each of the bounds of the visible content items can include a plurality of coordinates for identifying the width and length of the respective visible content item. In some implementations, the first predefined region of the web page extends from a first coordinate of a visible content item of the root element to a second coordinate towards the second predefined region, the second coordinate separated from the first coordinate by a first predetermined distance. In some implementations, the second predefined region of the web page extends from a third coordinate of the visible content item of the root element to a fourth coordinate towards the first predefined region, the fourth coordinate separated from the second coordinate by a second predetermined distance. In some implementations, the first and second predetermined distances are a predetermined number of pixels.

In some implementations, the data processing system identifies a third-party content item smaller than the width of the anchorable element. The data processing system identifies a plurality of positions relative to the anchorable element. The data processing system then determines that the position is usable for inserting a third-party content item. In some implementations, the data processing system can determine that the bounds of an inserted third-party content slot do not exceed bounds of any of the parents of the anchorable element associated with the position. The data processing system can further determine that the bounds of the inserted third-party content slot do not overlap with the bounds of any visible content items on the web page.

In some implementations, the data processing system determines a relative stability of the anchorable elements around which third-party content items can be inserted. The data processing system then sorts the generated list including positions relative to the identified anchorable elements that are determined to be usable based on the relative stability of the anchorable elements.

At least one aspect is directed to a system for identifying visually sensible locations in which third-party content can be placed on a web page. The system includes a memory storing processor-executable instructions and a processor. The processor is configured to identify a root element of a web page within which to insert one or more third-party content slots for providing third-party content items. The processor is configured to identify one or more visible content items within the root element and identifies anchorable elements within the root element around which a third-party content slot can be inserted. Each of the anchorable elements corresponds to a respective identified visible content item that has bounds that extend from a first predefined region of the web page to a second predefined region of the web page. The processor is configured to determine that one or more positions relative to the identified anchorable elements are usable for inserting a third-party content slot. The processor is configured to generate a list including positions relative to the identified anchorable elements that are determined to be usable.

In some implementations, the processor can identify a root element of the web page by inspecting source code of the web page. In some implementations, the processor identifies a text node or one or more predetermined tags within source code of the web page. In some implementations, the processor identifies anchorable elements within the root element around which a third-party content slot can be inserted by identifying all visible content items within the root element, recording the bounds of each of the identified visible content items and identifying an element corresponding to a visible content item that has bounds that extend from a first predefined region of the web page to a second predefined region of the web page as an anchorable element.

In some implementations, the processor determines bounds of the visible content items of the root element. Each of the bounds of the visible content items can include a plurality of coordinates for identifying the width and length of the respective visible content item. In some implementations, the first predefined region of the web page extends from a first coordinate of a visible content item of the root element to a second coordinate towards the second predefined region, the second coordinate separated from the first coordinate by a first predetermined distance. In some implementations, the second predefined region of the web page extends from a third coordinate of the visible content item of the root element to a fourth coordinate towards the first predefined region, the fourth coordinate separated from the second coordinate by a second predetermined distance. In some implementations, the first and second predetermined distances are a predetermined number of pixels.

In some implementations, the processor can identify a third-party content item smaller than the width of the anchorable element. The processor can identify a plurality of positions relative to the anchorable element. The processor can determine that the position is usable for inserting a third-party content item. In some implementations, the processor can determine that the bounds of an inserted third-party content slot do not exceed bounds of any of the parents of the anchorable element associated with the position. The processor can further determine that the bounds of the inserted third-party content slot do not overlap with the bounds of any visible content items on the web page.

In some implementations, the processor can determine a relative stability of the anchorable elements around which third-party content items can be inserted. The processor can sort the generated list including positions relative to the identified anchorable elements that are determined to be usable based on the relative stability of the anchorable elements.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for automatically identifying visually sensible locations in which third-party content can be placed on a web page are described. In addition, methods and systems for configuring the web page to display third-party content at the identified locations are also described. The methods and systems described herein aim to simplify the ability to display third-party content, such as ads, at visually sensible locations on a web page including primary content such that less tech-savvy web site owners can display third-party content on their webpage in a visually pleasing manner without having to manually modify source code of a web page. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
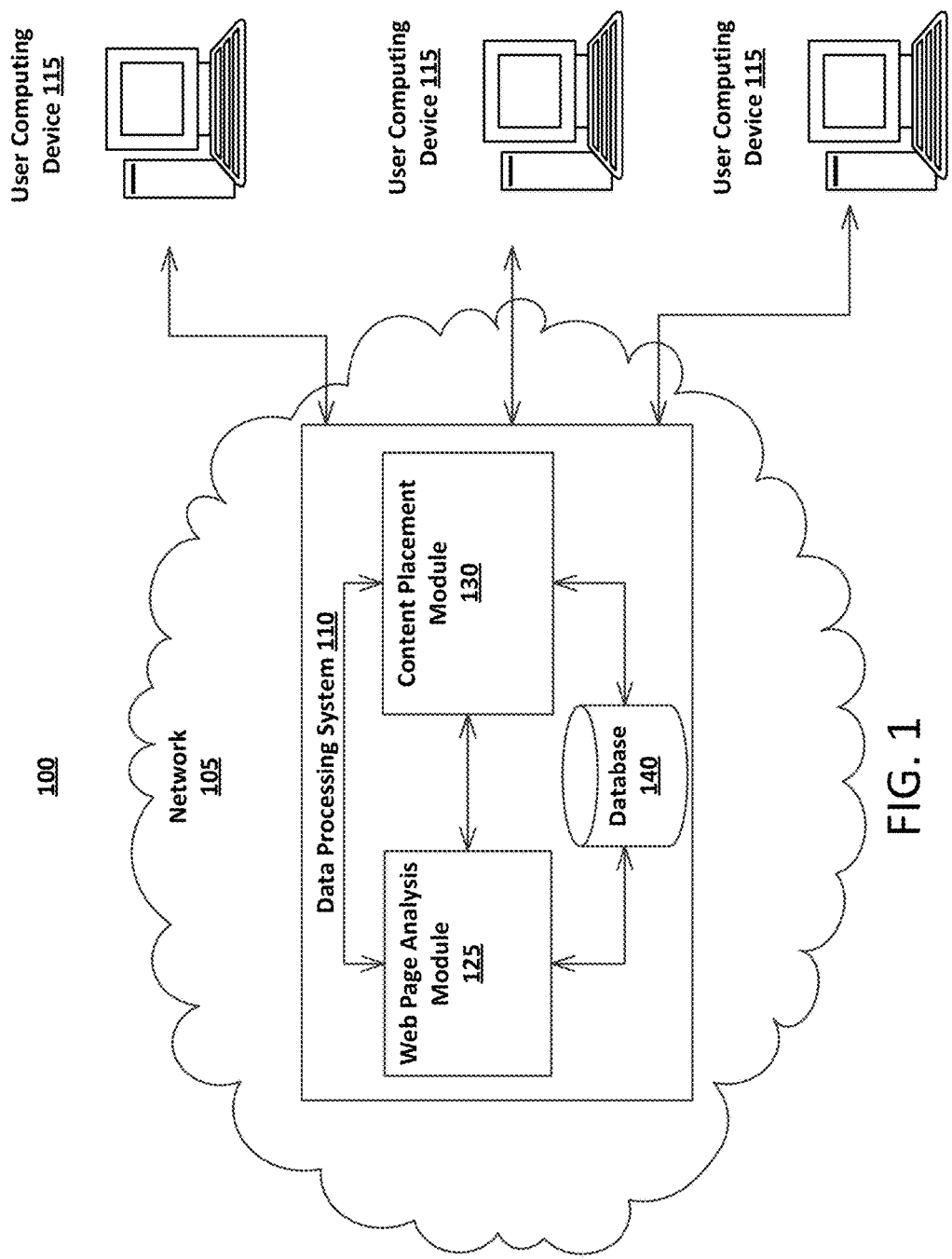
FIG. 1 is a block diagram depicting one implementation of an environment for identifying visually sensible locations in which third-party content can be inserted within a web page and configuring the web page to display third-party content at the identified locations.

FIG. 1 is a block diagram depicting one implementation of an environment for identifying visually sensible locations in which third-party content can be inserted within a web page and configuring the web page to display third-party content at the identified locations.

The system 100 includes at least one data processing system 110. The data processing system 110 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic.

The data processing system 110 can include one or more processors or other logic devices such as a computing device having a processor to communicate via a network 105 with at least one user computing device 115. In some implementations, the user computing device 115 and the data processing system 110 can communicate with one another via the network 105. The user computing device 115 can be a device through which a user can access one or more web pages. The user computing device 115 can be a device through which a user, such as a content publisher, submits a request to identify locations where third-party content can be inserted. In some implementations, the user computing device 115 can be a device through which a user can access web pages of a content publisher.

The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The user computing device 115 may be any number of different user electronic devices, for example, a laptop computer, a desktop computer, a tablet computer, a smartphone, a digital video recorder, a set-top box for a television, a video game console, or any other computing device configured to communicate via the network 105. The user computing device can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic.

The user computing device 115 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the user computing device 115 (e.g., a built-in display, microphone, etc.) or external to the housing of the user computing device 115 (e.g., a monitor connected to the user computing device 115, a speaker connected to the user computing device 115, etc.), according to various implementations. For example, the user computing device 115 may include an electronic display, which visually displays web pages using webpage data received from one or more content sources and/or from the data processing system 110 via the network 105.

The data processing system 110 can include one or more computing devices or servers that can perform various functions. The data processing system 110 can include at least one server. The data processing system 110 can include one or more modules, including a web page analysis module 125 and a content placement module 130. The web page analysis module 125 is designed, configured or constructed to analyze web pages to identify visible content and to identify possible locations within the web page where one or more third-party content slots can be placed such that when a third-party content item is inserted in a third-party content slot, the web page including the third-party content item are presented in a visually pleasing manner. The content placement module 130 is designed, configured or constructed to modify a web page to include one or more third-party content slots at one or more of the possible locations within the web page identified by the web page analysis module 125. In some implementations, the data processing system can include one or more modules that are configured to insert third-party content items in third-party content slots when a web page is provided for display at the user computing device 115. The data processing system 110 can also include one or more data stores, including database 140.

The web page analysis module 125 can be designed, constructed or configured to identify locations within a web page where one or more third-party content slots can be inserted. In some implementations, the web page analysis module 125 can be configured to identify locations such that when a third-party content item is inserted in one of the identified third-party content slots, primary content of the web page and the third-party content item are presented for display in a visually pleasing manner. In some implementations, the web page analysis module 125 can be configured to receive a web page from a content publisher. In some implementations, the web page analysis module 125 can receive a request to identify one or more possible locations within the web page in which third-party content items, such as ads, can be displayed. In some implementations, the request can include a request to automatically insert third-party content items in a web page so as to not adversely affect the aesthetics of the web page.

The web page analysis module 125 can be configured to analyze a received web page to identify one or more possible locations for inserting third-party content slots. In some implementations, the web page analysis module 125 can be configured to analyze the source code of the web page. In some implementations, the web page analysis module 125 can be configured to analyze the web page in a browser.

The web page analysis module 125 can be configured to identify a root element of a web page within which to insert third-party content slots. The root element of a web page can be a root element for an entire web page and corresponds to the top most node in a Document Object Model (DOM) tree. In some implementations, the root element of a web page can correspond to a root element for a region of a web page and can correspond to a node of a sub-tree of the DOM tree. In this way, the web page analysis module 125 is capable of finding visually sensible locations for inserting third-party content within any region of the web page that is defined by a sub-tree, for example, in a frame of the web page that extends along only one side of the web page. Stated in another way, the web page analysis module can be configured to identify a root element of a DOM tree or a sub-tree of the DOM tree of a web page in order to find different granularities of third-party content placements within the web page. The web page analysis module can identify a root element of a web page upon receiving a request from a content publisher, such as a web page creator. In some implementations, the web page analysis module 125 can receive the request from a user computing device 115 associated with the web page creator. In some implementations, the web page analysis module can be configured to provide a user interface through which the content publisher can submit a request. In some implementations, the web page analysis module 125 can be configured to identify a root element of a web page without receiving a request from a content publisher. The web page analysis module can be configured to identify a root element of web pages on the Internet which can benefit from the insertion of third-party content. In some such implementations, the web page analysis module can be configured to crawl the Internet identifying such web pages.

The web page analysis module 125 can identify a root element by inspecting the source code of the web page. In some implementations, the web page analysis module can identify the root element by rendering the web page and inspecting the DOM tree. In some implementations, the root element can enclose all the other elements and is therefore the sole parent element to all the other elements. For example, the web page analysis module 125 can identify a <BODY> element as a root element of the web page.

The web page analysis module 125 can be configured to identify visible content items within the root element. In some implementations, the web page analysis module 125 can analyze the source code of the received web page to identify all of the visible content items within the root element of the DOM tree. In some implementations, the web page analysis module can identify the visible content items within the root element of the web page by inspecting the DOM tree for elements within the root element that represent visible content items. Examples of elements that represent visible content items include a text node that contains a non-whitespace character, an image, an <HR> tag, an <IFRAME> tag, and <EMBED> tag, <an OBJECT> tag, a <VIDEO> tag, amongst others. In some implementations, the web page analysis module may be configured to identify that an element represents a visible content item by determining that the style attributes of an element or element's parent do not hide it. Examples of style attributes that would cause this are visibility being set to hidden, overflow being set to hidden, display being set to none, clip being defined, amongst others.

The web page analysis module 125 can be configured to identify the bounds of the identified visible content. In some implementations, the web page analysis module 125 can be configured to record the bounds of each of the identified visible content items. In some implementations, the web page analysis module 125 can be configured to identify the bounds of a visible content item by inspecting the source code. In some implementations, the web page analysis module can be configured to determine the bounds of the visible content item by inspecting a rendering of the web page on a browser pane. In some implementations, the bounds of a visible content item can be defined by the corners of a rectangle and can include four parameters, namely, left, right, top, and bottom. In some implementations, the bounds of a visible content item is the smallest rectangle that will fully contain the visible content item when rendered in a browser. The parameters can be expressed in absolute pixels from the top, left corner of a browser pane.

In some implementations, the web page analysis module 125 can be configured to remove bound outliers. In some such implementations, the web page analysis module can first identify one or more bound outliers. As part of identifying bound outliers, the web page analysis module 125 can generate lists of numbers corresponding to the coordinates of the identified visible content items.

The web page analysis module 125 can be configured to define a horizontal bound extending from a left coordinate to a right coordinate. The horizontal bound can be offset from the bounds of the visible content by a margin so that elements within the root element that are slightly narrower than the content bounds of the visible content of the root element are capable of being identified by the web page analysis module 125. In some implementations, the margin can be between about 10-50 pixels.

The web page analysis module 125 can be configured to identify anchorable elements within the root element around which a third-party content slot can be inserted. The web page analysis module can identify the anchorable elements by inspecting the source code of the web page. The web page analysis module 125 can be configured to identify one or more elements within the root element as an anchorable element if the visible content corresponding to the element has a width that extends from a first predetermined region to a second predetermined region. In some implementations, the first predetermined region is a region extending from a left most coordinate of the visible content of the root element to a left most coordinate of the horizontal bound. In some implementations, the second predetermined region is a region extending from a right most coordinate of the visible content of the root element to a right most coordinate of the horizontal bound. The web page analysis module 125 can be configured to filter out elements within the root element that do not extend from the first predefined region to the second predefined region.

The web page analysis module can, for each identified anchorable element, and for each position of third-party content item relative to the given anchorable element, determine a maximum width for any third-party content item anchored to the given anchorable element, in the given relative position, based on either the width of the anchorable element or the width of the anchorable element's DOM tree parent. The target width can be used to select a third-party content item that will have a width smaller than the width of the given anchorable element or the anchorable element's DOM tree parent. In this way, when a third-party content slot is positioned around the anchorable element, the third-party content item inserted in the third-party content slot will have a width smaller than the width of the anchorable element or the anchorable element's DOM tree parent. In some implementations, if the third-party content item is positioned before the anchorable element, the target width used to select the third-party content item can be smaller than the width of the anchorable element's DOM tree parent.

The web page analysis module 125 can be configured to determine that one or more positions relative to the identified anchorable elements are usable. The web page analysis module can determine one or more positions where the third-party content items can be inserted responsive to identifying the list of anchorable elements within the root element around which third-party content items can be inserted. In some implementations, these positions correspond to locations before an anchorable element, after an anchorable element, before a first child of the anchorable element or after the last child of the anchorable element, amongst others. The web page analysis module 125 can determine if a position is usable by determining that a third-party content item placed in the position does not adversely affect the visual representation of the web page when displayed on a browser. In some implementations, the web page analysis module 125 can be configured to determine if a position is usable by determining that the third-party content item when inserted at the position does not overlap other visible content items.

In some implementations, to determine if a position relative to the anchorable element is usable, the web page analysis module 125 can be configured to insert a third-party content item at a position relative to the anchorable element. The web page analysis module can do so by inserting an element corresponding to the third-party content item in the DOM tree of the web page. The web page analysis module 125 can insert the third-party content item corresponding to the third-party content item at a position before the anchorable element, after the anchorable element or before or after one or more children of the anchorable elements. As such, the position can correspond to an anchor-element-position pair.

After inserting the third-party content item at a position, the web page analysis module 125 can be configured to reflow the web page in a browser pane. The web page analysis module 125 can be configured to determine if the anchor-element-position pair is usable. In some implementations, the web page analysis module 125 can be configured to determine if the anchor-element-position pair is usable by determining that 1) the third-party content item is not overlapping existing visible content, 2) the third-party content item does not exceed the bounds of the anchor element or 3) any of the anchor element's parents or the bounds of the third-party content item lie outside the left coordinate or right coordinate of the bounds of the visible content corresponding to the root element.

If the anchor-element-position pair is determined to be usable, the web page analysis module 125 can be configured to include the position as a possible position in which the third-party content item can be inserted. In some implementations, the web page analysis module 125 can be configured to modify the source code to remove the third-party content item from the particular position and insert the third-party content item at another position relative to the anchorable element. In some implementations, the web page analysis module 125 can be configured to insert the third-party content item at various locations relative to the anchorable element sequentially such that at any given instant, the third-party content will be displayed at one location.

The web page analysis module 125 can be configured to generate a list including the usable positions relative to the identified anchorable elements. The list includes one or more anchor-element-position pairs. Each anchor-element-position pair corresponds to a position relative to a particular anchor element where a third-party content item can be inserted. In some implementations, each anchor-element-position pair includes one or more parameters, including the anchor element around which the third-party content item can be inserted, the position relative to the anchor element where the third-party content item can be inserted and a size of the third-party content item that can be inserted at the position relative to the anchor element. In some implementations, the web page analysis module can sort the list of anchor-element-position pairs according to the relative placement of the anchor element within the DOM tree.

In some implementations, the web page analysis module 125 can be configured to sort the list according to the stability of the anchor element associated with the anchor-element-position pairs. Stability refers to how likely an element is to be in the same schematic position on repeated viewings of a page over time. For example, the <BODY> tag is likely to be very stable since it should be present on every page load and should be the container for the whole page. In contrast, a specific text-node within a search result on a page is likely to be very unstable, since its presence depends on a specific result having been returned for a user search query. In some implementations, the web page analysis module 125 can be configured to determine the relative stability of an anchor-element based on the type of tag associated with the anchor element. The following tag types are arranged in order of decreasing stability: BODY, HEADER, NAV, H1, and IMG OR DIV. As such, an anchor-element corresponding to a BODY tag is more stable than an anchor-element corresponding to a DIV tag. In some implementations, the web page analysis module 125 can determine that an element with a unique DOM identifier is likely to be more stable than an element that does not have a unique DOM identifier. In some implementations, the web page analysis module 125 can determine that the stability of an element can be based in part on its size. As such, larger elements can be determined to be more stable than smaller elements. In some implementations, the web page analysis module 125 can determine that elements closer to the root DOM element are more stable than elements farther away from the root DOM element.

The content placement module 130 of the data processing system 110 can be designed, constructed or configured to insert third-party content items within a web page in a visually pleasing manner. In some implementations, the content placement module 130 can be configured to insert third-party content slots at one or more positions within a web page. The positions in which the content placement module 130 inserts the third-party content slots can correspond to one or more potential anchor-element-position pairs identified by the web page analysis module 125.

The content placement module 130 can be configured to modify the source code of a web page to insert third-party content items within a web page. The content placement module 130 can modify the source code responsive to receiving a request from a content publisher. In some implementations, the request can identify the anchor-element-position pair, which includes the identity of the anchor element around which the third-party content slot will be inserted, the specific position relative to the anchor element where the third-party content slot will be inserted and the size of the third-party content slot.

The content placement module 130 can be configured to automatically select an anchor-element position pair identifying the location where the third-party content slot is to be inserted. In some implementations, the content placement module 130 can be configured to select the anchor-element position pair from a list of anchor-element position pairs generated by the web page analysis module. In some implementations, the content placement module 130 can be configured to insert third-party content items in the third-party content slots.

In some implementations, the content placement module 130 can be configured to select one or more third-party content items from a list of third-party content items for insertion in the third-party content slots. In some implementations, the content placement module 130 can select a third-party content item for insertion based on information associated with the user computing device on which the web page is provided. As such, the content placement module can select a third-party content item that is relevant to a user associated with the user computing device. The content placement module 130 can be configured to select a third-party content item that matches the size of the third-party content slot. In some implementations, the content placement module 130 can be configured to modify the size of the third-party content item to match the size of the third-party content slot.

The database 140 can be designed, constructed or configured to store one or more anchor-element position pairs. In some implementations, the anchor-element position pair is stored as a data structure having one or more entries. In some implementations, the anchor-element position pair includes a name of the anchor-element position pair. In some implementations, the anchor-element position pair includes an entry identifying the anchor element relative to which the third-party content item can be inserted. In some implementations, the anchor-element position pair includes an entry identifying the position relative to the anchor element, for example, above the anchor element, below the anchor element, above the first child of the anchor element or below the last child of the anchor element. In some implementations, the anchor-element position pair includes a maximum size of the third-party content item that can be inserted at the particular position.

The data processing system can be configured to insert third-party content items at various locations within the web page, including but not limited to various locations within a particular portion of a web page. As shown in FIGS. 2B and 2C, the third-party content items can be inserted either in a main frame portion of a web page or within a side frame portion of the web page. In some implementations, the data processing system can be configured to insert third-party content items within a particular region of a frame of a web page. To do so, the web page analysis module can be configured to identify locations within a root element that corresponds to the particular region of interest.

The data processing system can be configured to insert any number of third-party content items. In some implementations, the content publisher can provide a maximum number of third-party content items to insert. In some implementations, the data processing system can automatically identify a maximum number of third-party content items to insert based on the size of the web page, the amount of revenue capable of being generated by the web page, the amount of revenue desired by the content publisher amongst others. It should be appreciated that the size, location and number of third-party content items being displayed on a web page can contribute to the amount of revenue capable of being generated by the web page.

Figure 2A:
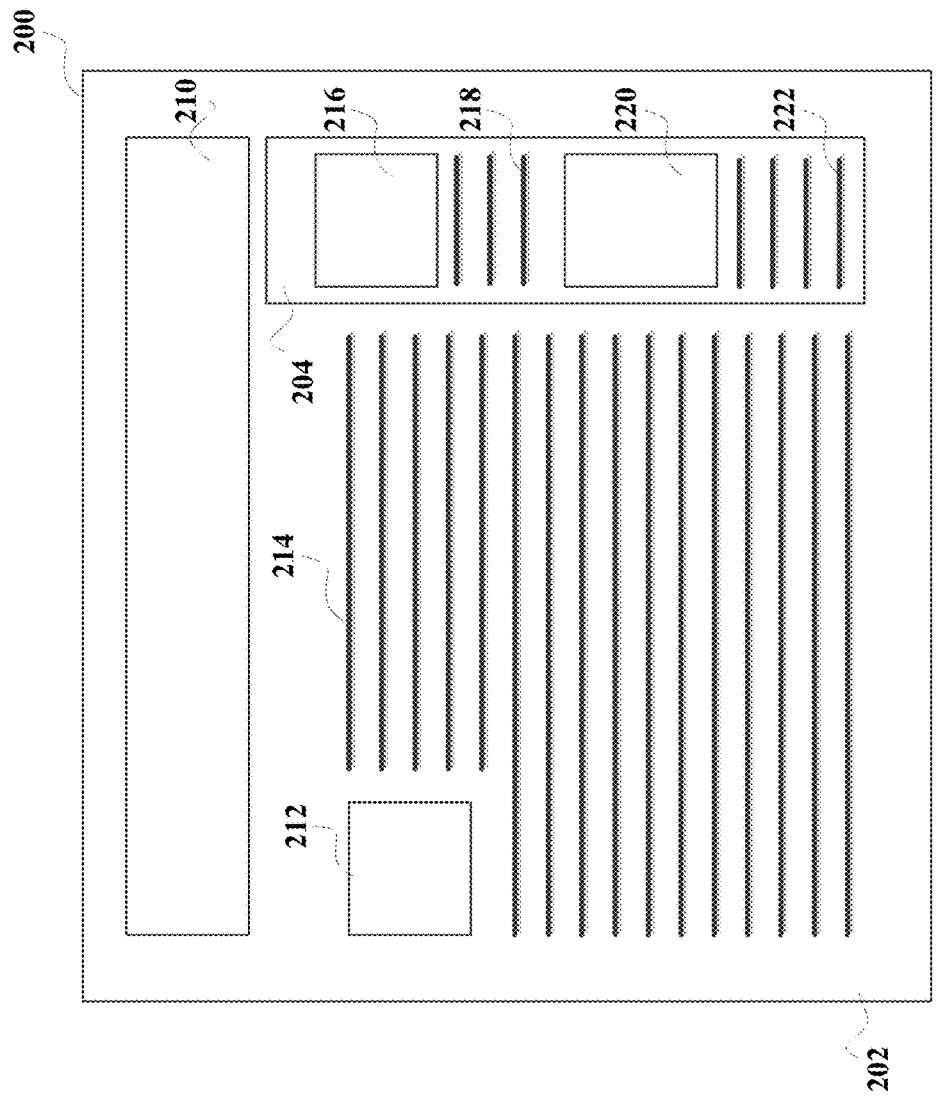
FIG. 2A is a diagram depicting one implementation of a web page in which third-party content can be inserted.
Figure 2B:
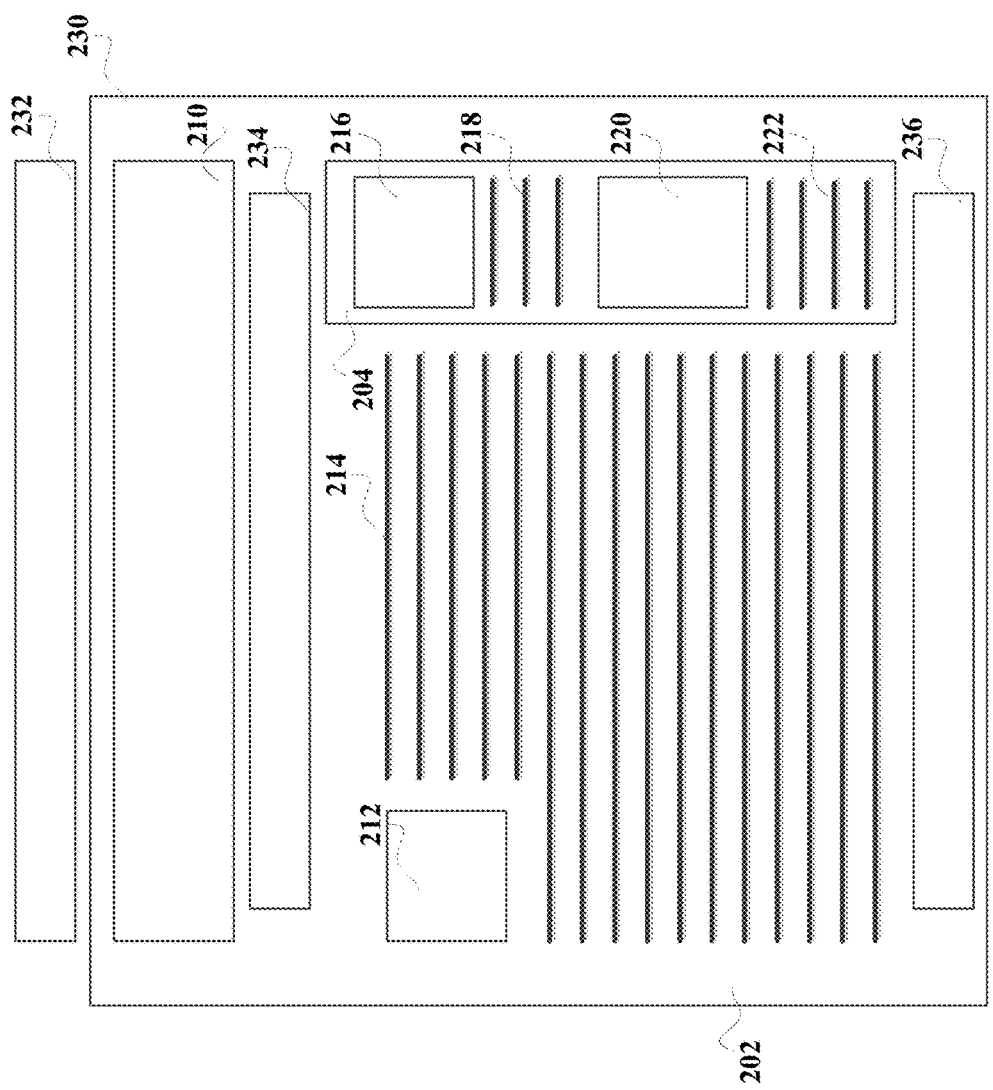
FIG. 2B is a diagram depicting one implementation of the web page shown in FIG. 2A in which third-party content is inserted in a main frame portion of the web page.
Figure 2C:
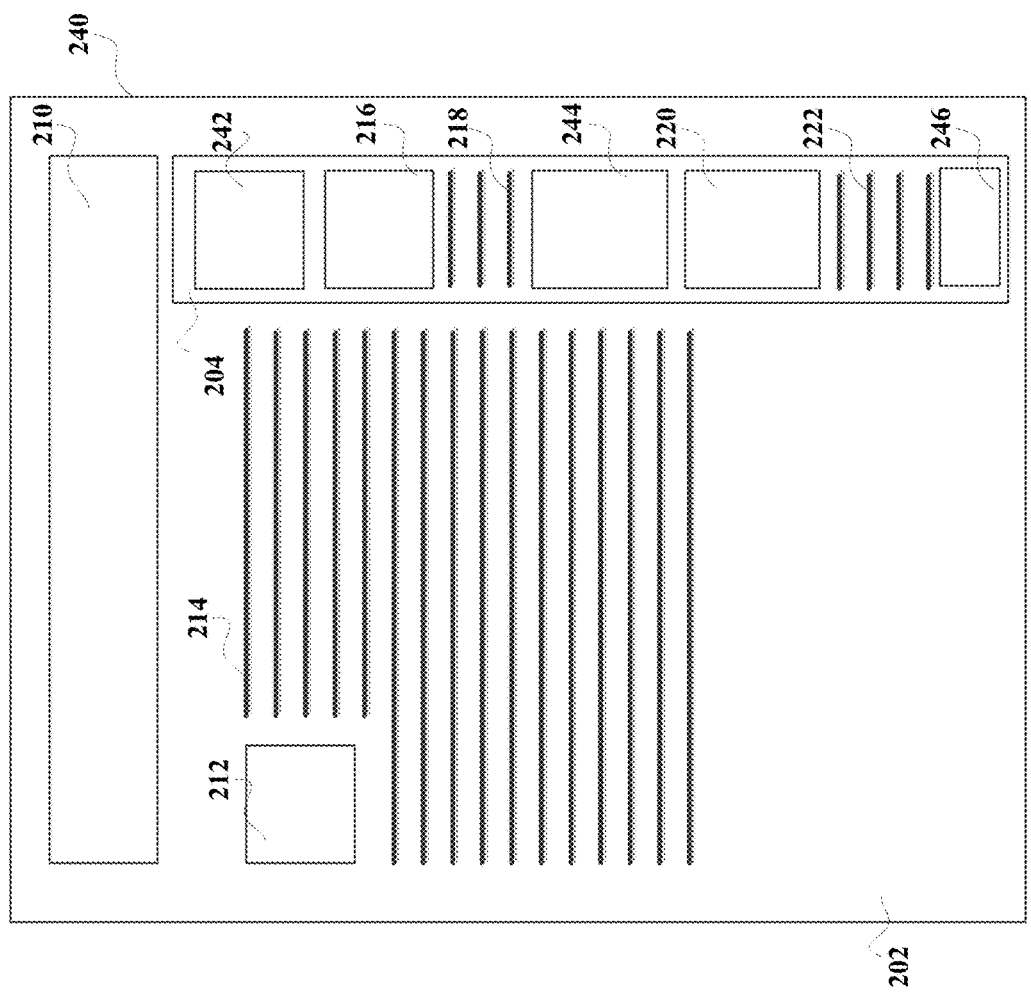
FIG. 2C is a diagram one implementation of a web page shown in FIG. 2A in which third-party content is inserted in a side frame portion of the web page.

Referring now to FIG. 2A, a diagram depicting one implementation of a web page in which third-party content can be inserted is shown. The web page 200 includes a main frame portion 202 and a side frame portion 204. The main frame portion 202 includes a header region 210, an image region 212 and a text region 214. The header region 210 extends across a substantial portion of the main frame portion 202. The side frame portion includes image regions 216 and 220 and text regions 218 and 222. The web page can have a URL address and can include source code, which when executed by a processor, presents the web page as shown in a browser pane.

Referring now to FIG. 2B, a diagram depicting one implementation of the web page shown in FIG. 2A in which third-party content is inserted in a main frame portion of the web page is shown. The web page 230 corresponds to the web page 200 in that they both can have the same URL. The web page 230 is identical to the web page 200 shown in FIG. 2A except that the web page 230 includes three third-party content slots 232, 234 and 236 inserted within the main frame portion 202 of the web page 230. The first third-party content slot 232 is inserted above the header portion 210, which corresponds to a header element in the source code of the web page. The second third-party content slot 232 is inserted below the header portion 210. The third third-party content slot 236 is inserted below the text region 214, which corresponds to another element in the source code of the web page. To insert third-party content items within the main frame portion 202 of the web page 230, the data processing system 110 can be configured to identify the main frame portion as the root element of the web page.

Referring now to FIG. 2C, a diagram one implementation of a web page shown in FIG. 2A in which third-party content is inserted in a side frame portion of the web page is shown. The web page 240 corresponds to the web page 200 shown in FIG. 2A in that they both can have the same URL. The web page 240 is identical to the web page 200 except that the web page 240 includes three third-party content slots 242, 244 and 246 inserted within the side frame portion 204 of the web page 240. The first third-party content slot 242 is inserted above a first image region 216. The second third-party content slot 232 is inserted above the second image region 220. The third third-party content slot 236 is inserted below the text region 222. To insert third-party content items within the side frame portion of the web page, the data processing system can be configured to identify the side frame portion as the root element of the web page.

Figure 3:
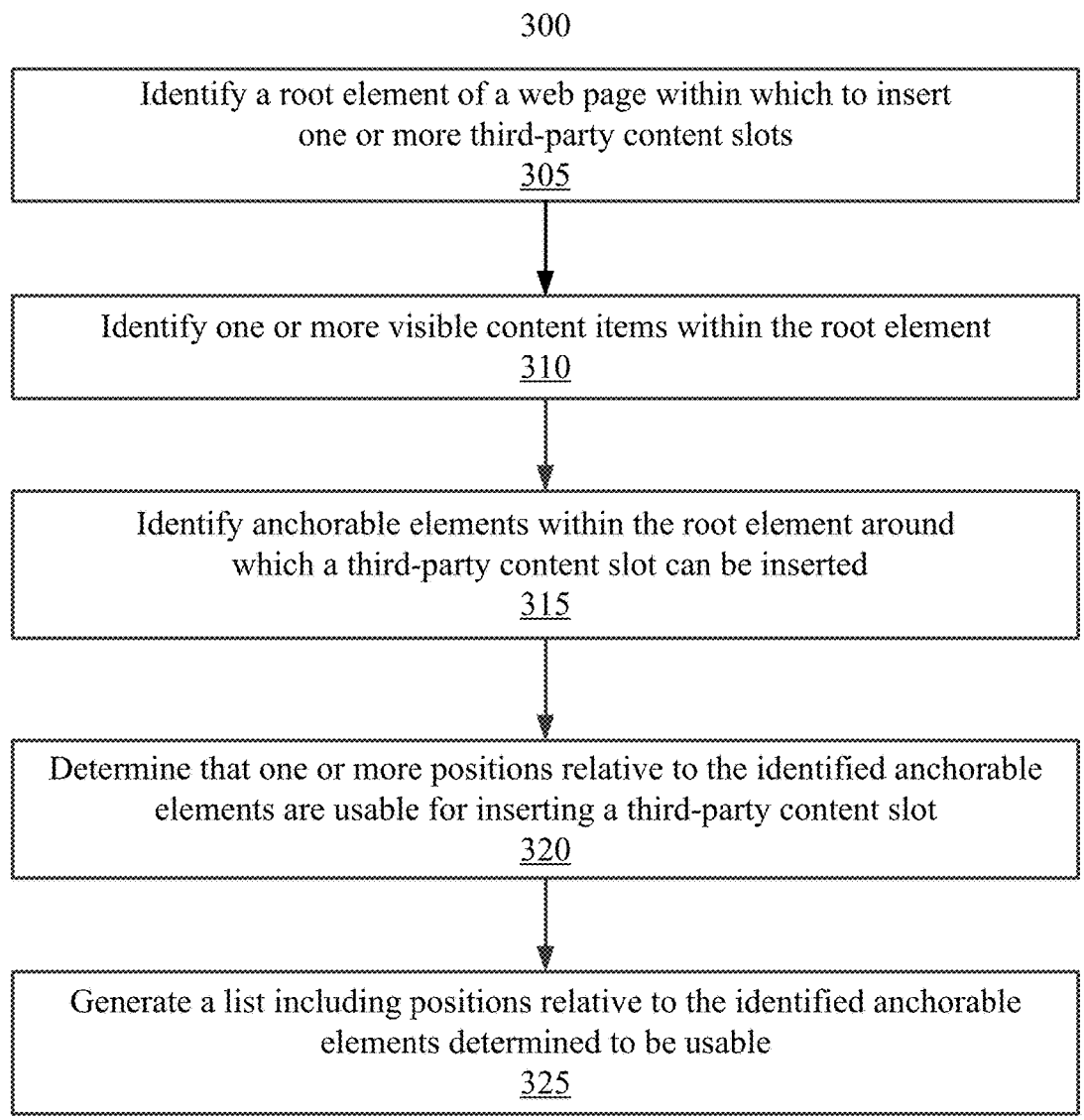
FIG. 3 is a flow diagram depicting one implementation of the steps taken to automatically identify visually sensible locations in which third-party content can be placed on a web page.

FIG. 3 is a flow diagram depicting one implementation of the steps taken to automatically identify visually sensible locations in which third-party content can be placed on a web page. In brief overview, a web page analysis module of a data processing system can identify a root element of a web page within which to insert third-party content slots (BLOCK 305). The web page analysis module then identifies visible content items within the root element (BLOCK 310). The web page analysis module then identifies anchorable elements within the root element around which a third-party content slot can be inserted (BLOCK 315). The web page analysis module can determine that one or more positions relative to the identified anchorable elements are usable for inserting third-party content items (BLOCK 320). The web page analysis module then generates a list including the usable positions relative to the identified anchorable elements (BLOCK 325).

In further detail, the web page analysis module can identify a root element of a web page within which to insert third-party content slots (BLOCK 305). The web page analysis module can identify a root element of a web page upon receiving a request from a content publisher, such as a web page creator. In some implementations, the request can include a request to identify one or more potential locations within a particular web page where third-party content items can be inserted in a visually pleasing manner without adversely affecting the aesthetics of the web page. In some implementations, the web page analysis module can be configured to provide a user interface through which the content publisher can submit a request. In some implementations, the web page analysis module can be configured to identify a root element of a web page without receiving a request from a content publisher. The web page analysis module can be configured to identify a root element of web pages on the Internet which can benefit from the insertion of third-party content. In some such implementations, the web page analysis module can be configured to crawl the Internet identifying such web pages.

The web page analysis module can identify a root element by inspecting the source code of the web page. The source code of the web page can include a Document Object Model (DOM) tree. In some implementations, the root element can be an element of the DOM tree. In some implementations, the root element can enclose all the other elements and is therefore the sole parent element to all the other elements. For example, the web page analysis module can identify a <BODY> element as a root element of the web page.

The web page analysis module can identify visible content items within the root element (BLOCK 310). In some implementations, the web page analysis module can analyze the source code of the received web page to identify all of the visible content items within the root element of the DOM tree. In some implementations, the web page analysis module can identify the visible content items within the root element of the web page by inspecting the DOM tree for elements within the root element that represent visible content items. Examples of elements that represent visible content items include a text node that contains a non-whitespace character, an image, an <HR> tag, an <IFRAME> tag, and <EMBED> tag, <an OBJECT> tag, a <VIDEO> tag, amongst others. In some implementations, the web page analysis module may be configured to identify that an element represents a visible content item by determining that the visible style attribute of an element or an element's parent is not hidden.

The web page analysis module, upon identifying all the visible content items within the root element, can identify the bounds of the identified visible content. In some implementations, the web page analysis module can be configured to record the bounds of each of the visible content items corresponding to the root element. In some implementations, the web page analysis module can identify the bounds of a visible content item by inspecting the source code. In some implementations, the web page analysis module can determine the bounds of the visible content item by inspecting a rendering of the web page on a browser pane. In some implementations, the bounds of a visible content item can be defined by the corners of a rectangle and can include four parameters, namely, left, right, top, and bottom. In some implementations, the bounds of a visible content item is the smallest rectangle that will fully contain the visible content item when rendered in a browser. The values can be expressed in absolute pixels from the top, left corner of a browser pane.

In some implementations, the web page analysis module can be configured to remove bound outliers. In some such implementations, the web page analysis module can first identify one or more bound outliers. In one specific implementation, the web page analysis module identifies bound outliers based on the coordinates of a plurality of elements, for example, three elements, such as the following:
  <DIV>: {left: 100, right: 300, top: 20, bottom: 200};
  <DIV>: {left: 10, right: 50, top: 10, bottom: 50}; and
  <SPAN>: {left: 150, right: 250, top: 400, bottom: 600}.

As part of identifying bound outliers, the web page analysis module can generate four lists of numbers corresponding to left coordinates, right coordinates, top coordinates and bottom coordinates. In particular, the web page analysis module can form the following lists:
  lefts: [100, 10, 150];
  rights: [300, 50, 250];
  tops: [20, 10, 400]; and
  bottoms: [200, 50, 600].

The web page analysis module can then sort each of the lists in ascending order and determine the lower and upper quartiles (Q1 and Q3). Q1 and Q3 are the lower and upper quartiles respectively. Q1 and Q4 can be calculated from a list $a=a[0], a[1], a[2], a[N-1]$, where $a[i]$ is the i'th number in the list and the numbers are arranged in ascending order.

$$Q1=a[\mathrm{floor}(N/4)]$$

$$Q3=a[\mathrm{floor}(3*N/4)].$$

In some implementations, for each list, the web page analysis module can consider bound outliers to have coordinates that have values that are either less than $Q1-k(Q3-Q1)$ or greater than $Q3+k(Q3-Q1)$, where k is a tunable parameter. In some implementations, the value of k can be 1. The web page analysis module can be configured to remove the outliers from each list. Once the outliers from each list are removed, the web page analysis module can define the bounds of the visible content as a rectangle defined as follows
C={left: min(lefts), right: max(rights), top: min(tops), bottom: max(bottoms)}.

Once the web page analysis module identifies a rectangle corresponding visible content within the root element that contains all non-outlier bounds, the web page analysis module can define a horizontal bound H extending from a left coordinate {left: C.left+m} to a right coordinate {right: C.right-m}, where m is a tunable parameter. The horizontal bound H takes into account a margin 'm' so that elements that are slightly narrower than the content bounds are not discarded. In some implementations, the value of m can be between 10-50 pixels. In some such implementations, the value of m can be about 20 pixels. By defining a horizontal bound that is smaller than the width of the visible content item corresponding to a particular element, the web page analysis module can identify elements within the root element that may serve as anchor elements despite being narrower than the rectangle representing visible content of the root element.

The web page analysis module can identify anchorable elements within the root element around which a third-party content slot can be inserted (BLOCK 315). The web page analysis module can identify the anchorable elements by inspecting the source code of the web page. The web page analysis module can be configured to identify one or more elements within the root element as an anchorable element if the visible content corresponding to the element has a width that extends from a first predetermined region to a second predetermined region. In some implementations, the first predetermined region is a region extending from C.left to C.left+m, which is the region that extends from the left coordinate of the smallest rectangle that contains all the non-outlier bounds and the left coordinate of the horizontal bound H. In some implementations, the second predetermined region is a region extending from C.right to C.right-m, which is the region that extends from the right coordinate of the smallest rectangle that contains all the non-outlier bounds and the right coordinate of the horizontal bound H. The web page analysis module can be configured to filter out the elements that do not extend between the first predefined region and the second predefined region. In some implementations, the web page analysis module can be configured to find all anchorable elements within the root node that have a left coordinate that is less than the corresponding left coordinate of the horizontal bound H and a right coordinate that is greater than the corresponding right coordinate of the horizontal bound H.

The web page analysis module can, for each identified anchorable element, determine a target width of a third-party content item that is smaller than the width of the anchorable element. The target width can be used to select a third-party content item that will have a width smaller than the width of the particular anchorable element. In this way, when a third-party content slot is positioned around the anchorable element, the third-party content item inserted in the third-party content slot will have a width smaller than the width of the anchorable element. In some implementations, a third-party content item that has a width that is larger than the width of a corresponding anchor element may be undesirable as the third-party content item may overlap other visible content located at the sides of the anchorable element. In some implementations, a third-party content item that is wider than the primary content may not appear to be visually pleasing, which is also undesirable.

The web page analysis module then determines that one or more positions relative to the identified anchorable elements are usable (BLOCK 320). Once the web page analysis module identifies the list of anchorable elements within the root element around which third-party content items can be inserted, the web page analysis module determines one or more positions where the third-party content slot can be inserted. In some implementations, these positions correspond to locations before an anchorable element, after an anchorable element, before a first child of the anchorable element or after the last child of the anchorable element, amongst others. The web page analysis module can determine if a position is usable by determining that a third-party content item placed in the position does not adversely affect the visual representation of the web page when displayed on a browser. In some implementations, the web page analysis module determines whether the third-party content item overlaps other visible content items, the background color of the third-party content item is different form the background color of the visible content item, amongst others.

In some implementations, the web page analysis module can insert a third-party content item at a position relative to the anchorable element. The web page analysis module can do so by inserting an element corresponding to the third-party content item in the DOM tree of the web page. The web page analysis module can insert the third-party content item corresponding to the third-party content item at a position before the anchorable element, after the anchorable element or before or after one or more children of the anchorable elements. As such, the position can correspond to an anchor-element-position pair. After inserting the third-party content item at a position, the web page analysis module can reflow the web page in a browser pane. The web page analysis module can determine if the anchor-element-position pair is usable upon determining that the third-party content item is not overlapping existing visible content, the third-party content item does not exceed the bounds of the anchor element or any of the anchor element's parents or the bounds of the third-party content item lie outside the left coordinate or right coordinate of the bounds of the visible content corresponding to the root element. If the anchor-element-position pair is determined to be not usable, the web page analysis module does not include the position as a possible position in which the third-party content item can be inserted. The web page analysis module can then modify the source code to remove the third-party content item from the particular position and insert the third-party content item at another position relative to the anchorable element. In some implementations, the web page analysis module may insert the third-party content item at various locations relative to the anchorable element sequentially such that at any given instant, the third-party content will be displayed at one location.

The web page analysis module then generates a list including the usable positions relative to the identified anchorable elements (BLOCK 325). The list includes one or more anchor-element-position pairs. Each anchor-element-position pair corresponds to a position relative to a particular anchor element where a third-party content item can be inserted. In some implementations, each anchor-element-position pair includes one or more parameters, including the anchor element around which the third-party content item can be inserted, the position relative to the anchor element where the third-party content item can be inserted and a size of the third-party content item that can be inserted at the position relative to the anchor element. In some implementations, the web page analysis module can sort the list of anchor-element-position pairs according to the relative placement of the anchor element within the DOM tree.

In some implementations, the web page analysis module can sort the list according to the stability of the anchor element associated with the anchor-element-position pairs. Stability refers to how likely an element is to be in the same semantic position on repeated viewings of a page over time. For example, the <BODY> tag is likely to be very stable since it should be present on every page load and should be the container for the whole page. In contrast, a specific text-node within a search result on a page is likely to be very unstable, since its presence depends on a specific result having been returned for a user search query. In some implementations, the web page analysis module can determine the relative stability of an anchor-element based on the type of tag associated with the anchor element. The following tag types are arranged in order of decreasing stability: BODY, HEADER, NAV, H1, and IMG OR DIV. As such, an anchor-element corresponding to a BODY tag is more stable than an anchor-element corresponding to a DIV tag. In some implementations, the web page analysis module can determine that an element with a unique DOM identifier is likely to be more stable than an element that does not have a unique DOM identifier. In some implementations, the web page analysis module can determine that the stability of an element can be based in part on its size. As such, larger elements can be determined to be more stable than smaller elements. In some implementations, the web page analysis module can determine that elements closer to the root DOM element are more stable than elements farther away from the root DOM element.

A content placement module of the data processing system can select one or more potential anchor-element-position pairs to be inserted into the web page. In some implementations, the content placement module can be configured to provide the list of usable anchor-element-position pairs to a content publisher for selection. In some other implementations, the content placement module can automatically select anchor-element-position pairs, thereby inserting third-party content items within the web page in a visually pleasing manner so as to not adversely affect the aesthetics of the web page.

Figure 4:
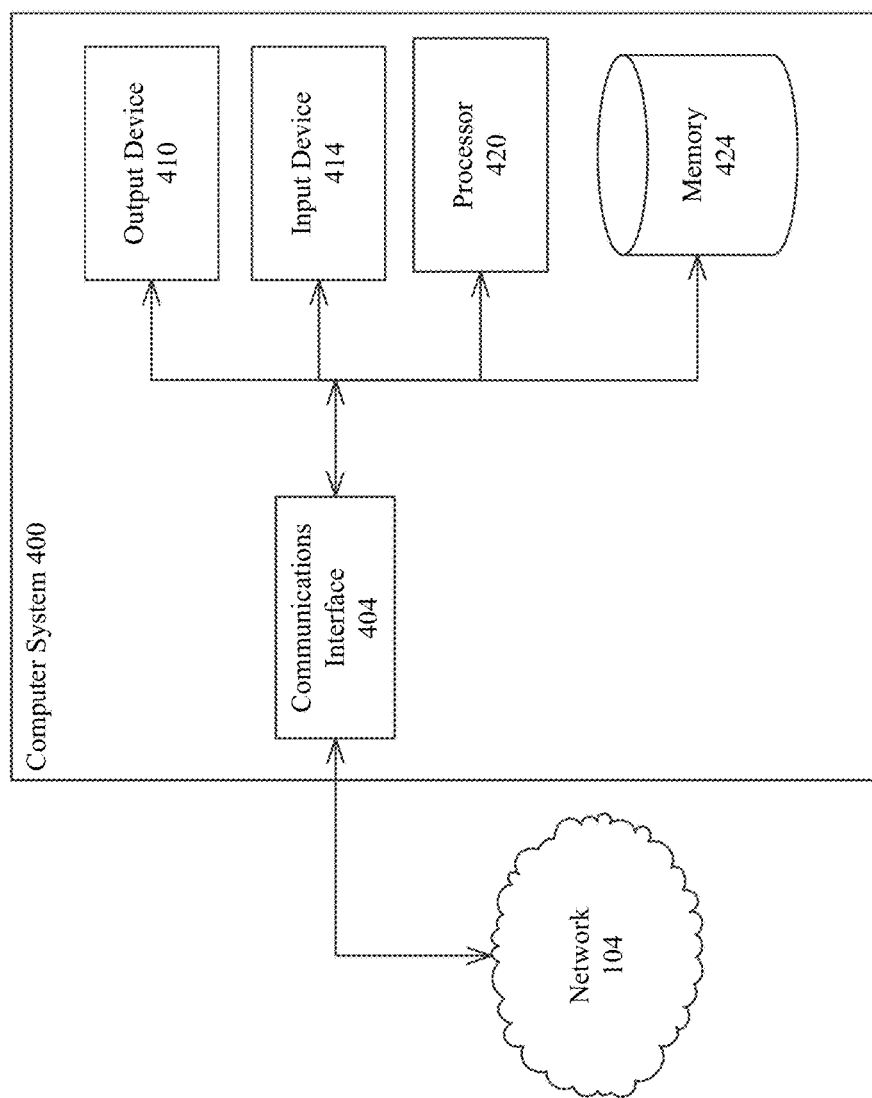
FIG. 4 is a block diagram illustrating a general architecture for a computer system that may be employed to implement various elements of the systems and methods described and illustrated herein, according to an illustrative implementation.

FIG. 4 shows the general architecture of an illustrative computer system 400 that may be employed to implement any of the computer systems discussed herein (including the system 100 and its components such as the web page analysis module 125 and the content placement module 130) in accordance with some implementations. The computer system 400 can be used to provide information via the network 105 for display. The computer system 400 of FIG. 4 comprises one or more processors 420 communicatively coupled to memory 425, one or more communications interfaces 404, and one or more output devices 410 (e.g., one or more display units) and one or more input devices 415. The processors 420 can be included in the data processing system 110 or the other components of the system 100 such as the web page analysis module 125 and the content placement module 130.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the web page analysis module 125 and the content placement module 130 can include the memory 425 to store information related to one or more anchor-element position pairs, web pages, data structures associated with anchor elements, anchor-element position pairs, web pages and corresponding web sites, amongst others. The memory 425 can include the database 140. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 404 to transmit or receive various information pursuant to execution of instructions. For example, the communications interface(s) 404 may be coupled to a wired or wireless network, bus, or other communication means and may therefore allow the computer system 400 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 400. Examples of communications interfaces 404 include user interfaces (e.g., web pages), through which the user can communicate with the data processing system 110.

The output devices 410 of the computer system 400 shown in FIG. 4 may be provided, for example, to allow various information to be viewed or otherwise perceived in connection with execution of the instructions. The input device(s) 415 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The web page analysis module 125 and the content placement module 130 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 400 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the web page analysis module 125 and the content placement module 130 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same embodiment. Any implementation or embodiment may be combined with any other embodiment, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to identifying locations in a web page for inserting content items, the systems and methods described herein can be applied to any program in any vertical in which any type of content can be inserted in a web page for display to a user. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for identifying locations in which third-party content can be placed on a web page, comprising:
    inspecting a source code or a document object model (DOM) tree of a web page, by a web page analyzer executed by a data processing system, to identify a root element of the web page;
    identifying, by the web page analyzer, one or more visible content items within the root element having boundaries within a predefined region of the web page, each visible content item corresponding to an anchorable element within the root element;
    determining, by the data processing system, bounds of each of the visible content items within the root element, the bounds of each visible content item defined by coordinates identifying a width and a length of the visible content item;
    identifying a first subset of the anchorable elements adjacent to which a third-party content slot is insertable;
    determining, for each anchorable element of the first subset of the anchorable elements, whether a position adjacent to said anchorable element is usable for inserting the third-party content slot by:
        identifying bounds of the third-party content slot,
        identifying bounds of each parent element of said anchorable element,
        determining whether the bounds of the third-party content slot exceed the bounds of any of the parents of said anchorable element,
        determining whether the bounds of the third-party content slot overlap with the bounds of any visible content items on the web page using the determined bounds of the visible content items of the root element, and
        identifying the position adjacent to said anchorable element as usable or not useable responsive respectively to (i) the bounds of the third-party content slot not exceeding the bounds of any of the parents of said anchorable element and not overlapping the bounds of any visible content items within the root element, or (ii) the bounds of the third-party content slot exceeding the bounds of any of the parents of said anchorable element or overlapping the bounds of any visible content items within the root element;

generating a list including positions adjacent to anchorable elements identified as useable; and inserting the third-party content slot in one of the positions in the generated list.

2. The method of claim 1, wherein identifying one or more visible content items within the root element comprises identifying a text node or one or more predetermined tags within the source code or the DOM tree of the web page.

3. The method of claim 1, wherein identifying the first subset of anchorable elements comprises:

identifying all visible content items within the root element;

recording the bounds of each of the identified visible content items; and identifying a visible content item that has boundaries from a first predefined region of the web page to a second predefined region of the web page as an anchorable element.

4. The method of claim 1, wherein each visible content item has boundaries from a first predefined region of the web page to a second predefined region of the web page, and wherein:

the first predefined region of the web page extends from a first coordinate of a visible content item of the root element to a second coordinate towards the second predefined region, the second coordinate separated from the first coordinate by a first predetermined distance; and the second predefined region of the web page extends from a third coordinate of the visible content item of the root element to a, fourth coordinate towards the first predefined region, the fourth coordinate separated from the second coordinate by a second predetermined distance.

5. The method of claim 4, wherein the first and second predetermined distances are a predetermined number of pixels.

6. The method of claim 1, wherein identifying the first subset of anchorable elements comprises:

determining, by the data processing system, a relative likelihood of each element maintaining a schematic position on repeated viewings of the web page over time of the anchorable elements within the root element; and selecting the anchorable elements for inclusion in the first subset of anchorable elements based on the determined relative likelihood of the anchorable elements.

7. A system for identifying locations in which third-party content can be placed on a web page, comprising:

a memory storing source code or a document object model (DOM) tree of a web page;

and a processor executing a web page analyzer, configured to:

inspect the source code or DOM tree of the web page a document object model (DOM) tree of a webpage, to identify a root element of the web page;

identify one or more visible content items within the root element having boundaries within a predefined region of the web page, each visible content item corresponding to an anchorable element within the root element;

identify a first subset of the anchorable elements adjacent to which a third-party content slot is insertable;

determine, for each anchorable element of the first subset of the anchorable elements, whether a position adjacent to said anchorable element is usable for inserting the third-party content slot by:

identifying the bounds of the third-party content slot, identifying the bounds of each parent element of said anchorable element, determining whether the bounds of the third-party content slot exceed the bounds of any of the parents of said anchorable element, determining whether the bounds of the third-party content slot overlap with the bounds of any visible content items on the web page, and identifying the position adjacent to said anchorable element as usable or not useable responsive respectively to (i) the bounds of the third-party content slot not exceeding the bounds of any of the parents of said anchorable element and not overlapping the bounds of any visible content items, or (ii) the bounds of the third-party content slot exceeding the bounds of any of the parents of said anchorable element or overlapping the bounds of any visible content items;

generate a list including positions adjacent to anchorable elements identified as useable relative to the identified first subset of anchorable elements; and insert the third-party content slot in one of the positions in the generated list.

8. The system of claim 7, wherein the web page analyzer is further configured to identify a text node or one or more predetermined tags within the source code or the DOM tree of the web page.

9. The system of claim 7, wherein the web page analyzer is further configured to:

identify all visible content items within the root element;

record the bounds of each of the identified visible content items; and identify a visible content item that has boundaries from a first predefined region of the web page to a second predefined region of the web page as an anchorable element.

10. The system of claim 7, wherein the web page analyzer is further configured to determine bounds of the visible content items of the root element, wherein each of the bounds of the visible content items includes a plurality of coordinates for identifying the width and length of the respective visible content item.

11. The system of claim 7, wherein each visible content item has boundaries from a first predefined region of the web page to a second predefined region of the web page, and wherein:

the first predefined region of the web page extends from a first coordinate of a visible content item of the root element to a second coordinate towards the second predefined region, the second coordinate separated from the first coordinate by a first predetermined distance; and the second predefined region of the web page extends from a third coordinate of the visible content item of the root element to a fourth coordinate towards the first predefined region, the fourth coordinate separated from the second coordinate by a second predetermined distance.

12. The system of claim 11, wherein at least one of the first and second predetermined distances is a predetermined number of pixels.

13. The system of claim 7, wherein the processor is further configured to:

determine a relative likelihood of maintaining a schematic position on repeated viewings of the web page over time of each of the anchorable elements within the root element; and sort the anchorable elements based on the determined relative likelihood of the anchorable elements.

\* \* \* \* \*